United States Patent [19]
Cattaneo

[11] Patent Number: 4,997,045
[45] Date of Patent: Mar. 5, 1991

[54] HORSESHOE LINER

[76] Inventor: Giuseppe Cattaneo, Via Maistra 46, CH-7500 St. Moritz, Switzerland

[21] Appl. No.: 283,432

[22] Filed: Dec. 12, 1988

[30] Foreign Application Priority Data

Dec. 17, 1987 [CH] Switzerland ............... 4910/87

[51] Int. Cl.⁵ .............................................. A01L 7/02
[52] U.S. Cl. ........................................ 168/12; 168/28
[58] Field of Search ................. 168/12, 13, 14, 26, 168/28, 34, 31, 38, 41

[56] References Cited

U.S. PATENT DOCUMENTS

| | | | |
|---|---|---|---|
| 639,201 | 12/1899 | Stamm | 168/13 |
| 3,952,807 | 4/1976 | Lattaneo | 168/28 |
| 4,557,334 | 12/1985 | Lattaneo | 168/12 |

FOREIGN PATENT DOCUMENTS

| | | | |
|---|---|---|---|
| 36995 | 9/1930 | France | 168/12 |
| 21757 | of 1906 | United Kingdom | 168/28 |
| 162409 | 5/1921 | United Kingdom | 168/12 |
| 1584339 | 2/1981 | United Kingdom | 168/12 |

Primary Examiner—John Weiss
Attorney, Agent, or Firm—Pollock, Vande Sande and Priddy

[57] ABSTRACT

A horseshoe liner (1) having a relatively light-weight, soft and flexible liner element (1') which is arranged between the horseshoe (3) and the hoof (2) of a hoofed animal has, on its upper side, between the inner edge of the horseshoe (3) and a rocking edge part (4) projecting into the sole area (5) of the hoof, hollow sections (7) which are capable of elastic shape changes and are adjacent to the inside of the horseshoe. The hollow sections are arranged longitudinally adjacent to one another at distances (8) apart and are capable of absorbing laterally applied pressure.

8 Claims, 2 Drawing Sheets

Ansicht „A"

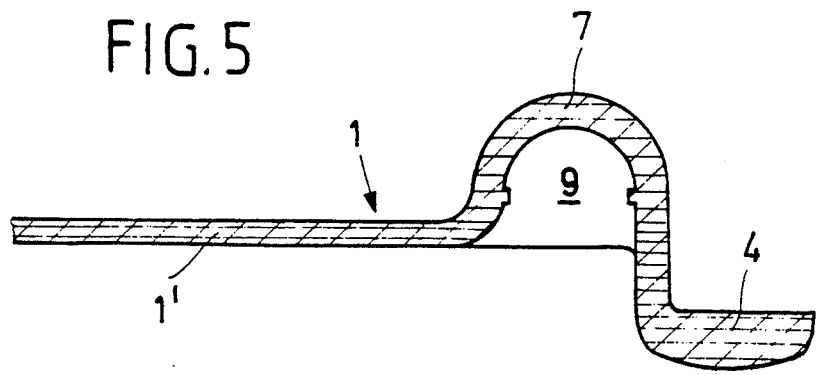
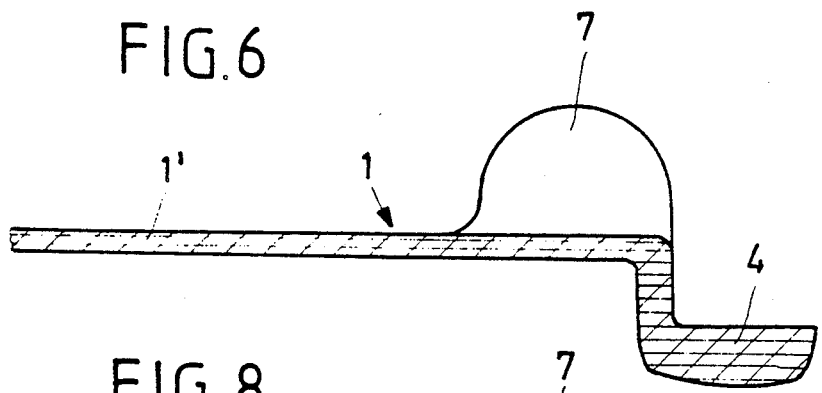
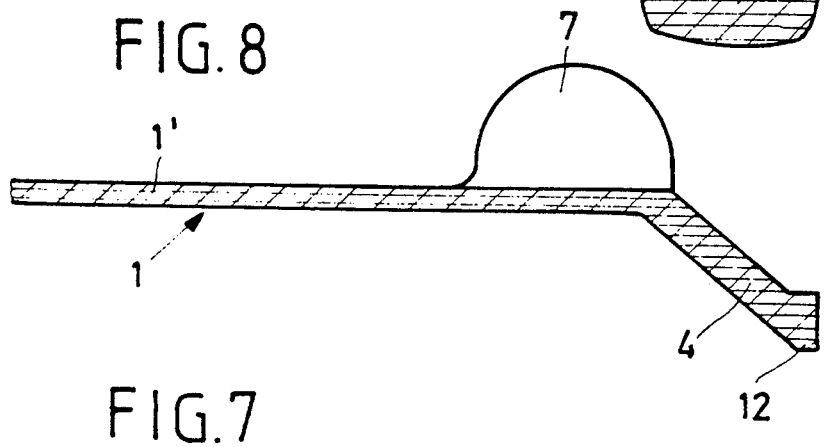
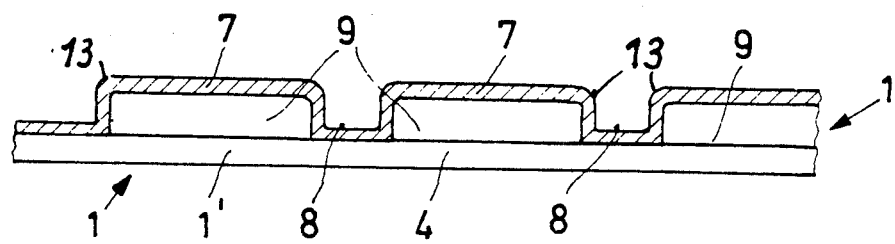
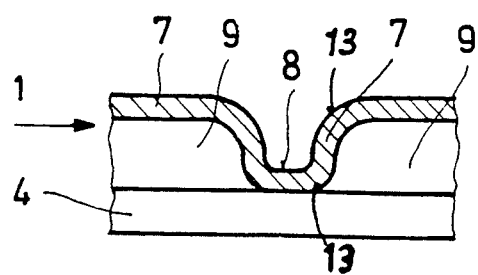

HORSESHOE LINER

BACKGROUND OF THE INVENTION

Horseshoe liners of rubber-like material, which are intended to prevent the adhesion of foreign substances, such as snow and ice, to the hoof and to make it easier for hoofed animals, in particular horses, to walk on hard ground, are known. Foreign substances are repelled by means of freely movable, deformable parts projecting into the sole area. These lie close to the lower inner edges of the horseshoe, at which edges the impacts and the risk of damage are very great. The liners therefore had a relatively solid construction and, because of the large amount of material used, production is likewise expensive. Mounting such prefabricated liners proved to be a considerable problem because, as a rule, their shape does not correspond to the hoof and to the horseshoe, necessitating manual adaptation and making it essential for the assembly points to keep a large stock of liners in various sizes.

SUMMARY OF THE INVENTION

The present invention relates to a horseshoe liner which requires little material, is easy and cheap to pruduce, has high flexibility and can normally be mounted on horseshoes without inconvenient adaptation. These objects are achieved by the features defined in claim 1. Advantageous further embodiments are described in the dependent claims 2 to 8.

BRIEF DESCRIPTION OF THE DRAWINGS

The accompanying drawings show, for example, embodiments of the subject of the invention;

FIG. 5 is a section along the line V–V in FIG. 1, enlarged several times, FIG. 6 is a section along the line VI–VI in FIG. 1, likewise, on an enlarged scale, FIG. 7 is a section along the line VII–VII in FIG. 1, once again on an enlarged scale, FIG. 8 is a partial section of a variant along the line VI–VI in FIG. 1, on an enlarged scale, and FIG. 9 is a partial section along the line VII–VII in FIG. 1, in a variant.

DESCRIPTION OF THE PREFERRED EMBODIMENTS

Figure 1:
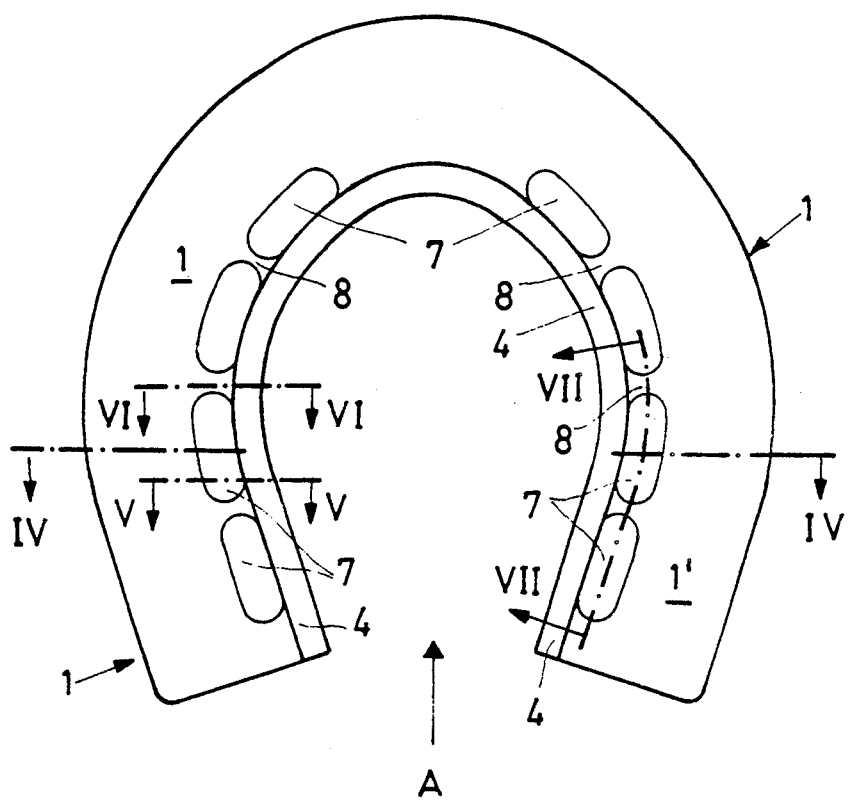
FIG. 1 is a view of the horseshoe liner from the underneath.
Figure 3:
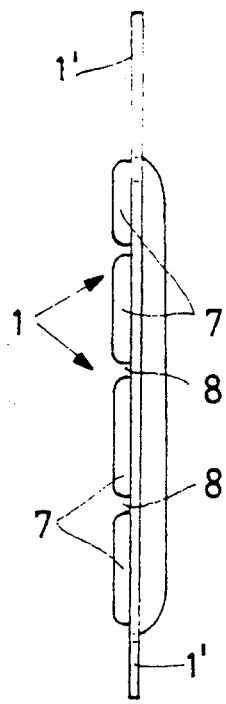
FIG. 3 is a view from the right side of FIG. 1.
Figure 2:
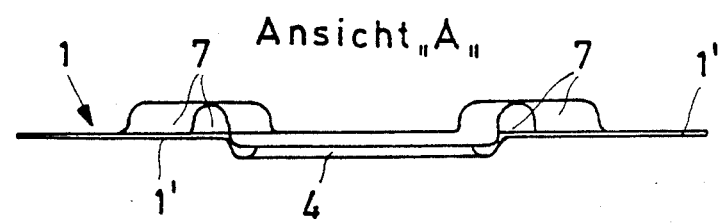
FIG. 2 is a view in the direction of arrow A in FIG. 1.
Figure 4:
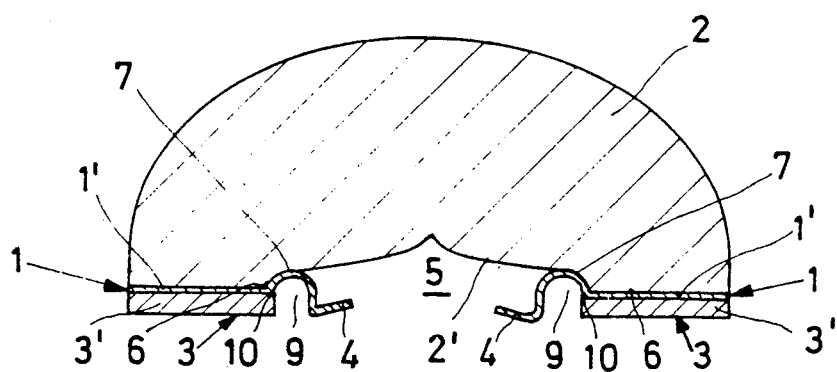
FIG. 4 is a cross-section along the line IV–IV in FIG. 1 together with the hoof, in a first embodiment.

FIG. 1 represents a horseshoe-shaped liner element 1 which is arranged between the hoof 2 and the horseshoe 3 (see FIG. 4) of a hoofed animal, such as a horse, and is made of soft, rubber-like material. The liner element 1 expediently has a thickness of about 1 mm. The material requirement of the light-weight liner element 1 is small, which makes the production costs economical. The inner edge part 4 moves freely in space 5 underneath the sole 2′ of the hoof. Elongated, caterpillar-like hollow sections 7 which are directed upward toward the hoof 2 and have a height of about 5–6 mm, a width of about 8 mm and a length of about 2.5 cm are located adjacent to the edge part 4, which expediently has a width of about 5 mm, on the upper side at the transition point 6 from the flat liner element 1 to the angled edge part 4. The hollow sections 7 are located only at the lateral limbs of the liner element 1. There is a distance 8 of about 4–5 cm between the two adjacent hollow sections at the summit of the liner element 1. The other hollow sections are each spaced about 3–5 mm from one another. In the upper part, the hollow sections 7 have a semicircular cross-section. The hollow sections 7 have apertures 9 underneath, adjacent to the flat liner element 1, and are groove-like.

The hollow sections 7 are at a distance of about 6 mm from the inside of the edge part 4, and they are about 3 times more rigid than the latter and the flat liner element piece 1′. The hollow sections 7 act as joint-like, viscoplastic intermediate members when the edge part 4 is pressed upward into the space 5 by foreign bodies while the hoofed animal is walking, and is curved and executes rocking movements. Without this property, the continuous rocking movements during walking would cause relatively rapid and disadvantageous damage to the horseshoe, owing to the thin and weak constitution of the liner element 1 and the effect of the inner angular edge 10. The distances 8 facilitate bending of the liner element 1 with the hollow sections along the inside of the horseshoe, resulting in adaptation to the inside of the horseshoe.

The agency which mounts horseshoe liners is not forced to keep an extensive stock of liners of different sizes. Furthermore, owing to the hollow sections spaced at intervals from one another, adaptation to the hoof by skilled workers is no longer necessary.

In the variant according to FIG. 8, the edge part 4 occupies a position running obliquely downward toward the inside and is provided at its free end with a thicker edge 12 acting as a reinforcement. In the variant in FIGS. 7 and 9, the walls of the hollow section 7 have rounded corner parts 13 in the region of the distances 8, with the result that the adhesion of pasty foreign substances is hindered. The weight of the liner is only about 25 g, whereas the conventional versions weigh at least more than twice as much.

The liner element 1 expediently consists of a conventional fabric of organic, synthetic and/or metallic material completely or partially embedded in rubber-like material.

I claim:

1. A horseshoe liner for placement between the hoof and the horseshoe of a hoofed element, said liner comprising a soft, flexible, flat, horseshoe-shaped member having a movable edge part which is directed into the space defined by the inner perimeter of the horseshoe and which functions to repel foreign substances. said member having sections which project above the upper side of said member, said sections having hollow interiors and being more rigid than said movable edge part and acting as reinforcements adjacent to said movable edge part, and said sections being spaced from one another to increase the flexibility of the liner in the peripheral direction of the liner.

2. A horseshoe liner as claimed in claim 1. wherein said sections have elongated apertures underneath said member.

3. A horseshoe liner as claimed in claim 2, wherein said sections are bead-like and their apertures are groove-like.

4. A horseshoe liner as claimed in claim 2, wherein the lengths of said sections are several times greater than the widths of said apertures.

5. A horseshoe liner as claimed in claim 1, wherein said sections form viscoplastic stops which are adapted to rest against the inside of said horseshoe.

6. A horseshoe liner as claimed in claim 1 wherein said horseshoe shaped member has a pair of curved limbs that merge into one another at a curved summit between said limbs, the distances between two adjacent ones of said sections in the region of said summit being greater than the distances between adjacent ones of said sections in the region of said limbs.

7. A horseshoe liner as claimed in claim 1, wherein the inner end of the edge part is provided with a thicker part forming a reinforcement.

8. A horseshoe liner as claimed in claim 1, wherein said member consists of a rubber-like material having embedded fabric.

* * * * *